United States Patent [19]

Taylor et al.

[11] Patent Number: 4,514,104
[45] Date of Patent: Apr. 30, 1985

[54] SELF-SUPPORTING ELEMENT FOR MOSAIC DISPLAY PANEL

[75] Inventors: Frank Taylor, St-Eustache; Klemens Maurer, Candiac, both of Canada

[73] Assignee: Monitronik Ltee, Quebec, Canada

[21] Appl. No.: 390,056

[22] Filed: Jun. 18, 1982

[51] Int. Cl.³ .............................................. F16B 5/07
[52] U.S. Cl. ..................... 403/14; 403/331; 403/381
[58] Field of Search ............... 403/331, 381, 380, 382, 403/353, 354, 248, 13, 14; 108/91, 901; 206/509

[56] References Cited

U.S. PATENT DOCUMENTS

| | | | |
|---|---|---|---|
| 1,124,228 | 1/1915 | Houston | 403/381 |
| 1,130,324 | 3/1915 | Owen | 403/381 X |
| 1,954,242 | 4/1934 | Heppenstall | 403/381 |
| 2,730,347 | 1/1956 | Bruestle et al. | 403/409 X |
| 3,090,086 | 5/1963 | Fata | 403/381 |
| 3,195,735 | 7/1965 | Jay | 403/353 X |
| 3,874,804 | 4/1975 | Siegal | 403/381 X |
| 4,419,838 | 12/1983 | Taylor et al. | 40/605 |

FOREIGN PATENT DOCUMENTS 1126023  6/1982  Canada .
180580   6/1922  United Kingdom ................ 403/331

Primary Examiner—Andrew V. Kundrat
Attorney, Agent, or Firm—Cushman, Darby & Cushman

[57] ABSTRACT

The disclosure herein describes an element so constructed as to inter-connect with a similarly constructed element in the making of a mosaic display panel, the element defining a rectangular body, the outer wall of which is provided with a longitudinal projecting guide and a longitudinal channel transversely spaced from one another; the channel has a cross-section so dimensioned as to include therein the cross-section of the guide whereby the guide and channel of an adjacently disposed similarly constructed element may interfit in the channel and guide, respectively, of the first element; each channel includes, at one end thereof, an entry pocket to funnel initial engagement of the guide of two adjacent elements to be engaged to one another in a sliding motion.

7 Claims, 3 Drawing Figures

SELF-SUPPORTING ELEMENT FOR MOSAIC DISPLAY PANEL

The present invention relates, in general, to mosaic display panels adapted primarily for representing large distribution or control systems, for example electric power distribution systems. More particularly, this invention concerns a self-supporting element so constructed as to inter-connect with a similarly constructed element or other components in the forming of such display panels.

One example of such a mosaic panel is found described in Canadian Pat. No. 1,126,023 issued June 22, 1982. A series of inter-connected horizontal and vertical members support a mosaic of tiles and control instruments through interfitting components which include self-supporting inter-connected blocks and mounting elements. In the above-mentioned patent application, the components have the outer face of their sidewalls constructed with tabs and guideways, complementary in shape, so as to engage correspondingly shaped guideways and tabs of adjacently disposed components. Thus, a cluster of such components may be formed and, itself, be mounted to the horizontal and vertical support members to form such panel. They are qualified as "self-supporting" in that it is the cluster which is supported to the panel frame and not each element separately.

The present invention is concerned with improving the inter-connection between each self-supporting element. Present elements are made of thermoplastic material and a compression fit exists when parts are inter-connected. It has been found that the tension present in the material does not permit overstressing so that the spring action which occurs during inter-connection is not a true spring action. In fact, there is material deformation in the parts, once inter-connected. Such deformation greatly affects this spring action resulting in high engagement forces during the making of a display panel as well as high disengagement forces when it is necessary to remove one or more of these components to form a different panel display (which requires substituting tiles), to insert an instrument, or to replace a damaged component. Some of these panels contain thousands of inter-connected elements, it can therefore be understood that the manipulation of these elements and the formation of a display panel become awkward and costly if the interfitting operation is hindered by parts which are difficult to connect or disconnect.

The present invention overcomes the abovementioned problems by providing on each sidewall of a self-supporting element a channel and a guide, complementary in shape, which assures easy engagement of two adjacent elements. Still, each channel and each guide are provided with a pocket entry to facilitate the initial engagement of the adjacent elements.

The present invention therefore relates, in its broadest aspect, to a self-supporting element which comprises a rectangular body having a sidewall displaying on the outer face thereof outwardly projecting longitudinal guide means and longitudinal channel means spaced transversely from the guide means; the channel means have a cross-section so dimensioned as to include therein the cross-section of the guide means whereby the guide means and channel means of a similarly constructed sidewall of an adjacently disposed element slidably interfit in the channel means and the guide means respectively; each guide means and channel means include, at one end thereof, an entry pocket to funnel initial engagement of the guide means and channel means of two adjacent self-supporting elements to be engaged to one another in a sliding motion.

The scope of applicability of the present invention will become apparent from the detailed description given hereinafter; it should be understood however, that this description, while indicating preferred embodiments of the invention, is given by way of illustration only since various changes and modifications within the spirit and scope of the invention will become apparent to those skilled in the art.

IN THE DRAWINGS

Figure 1:
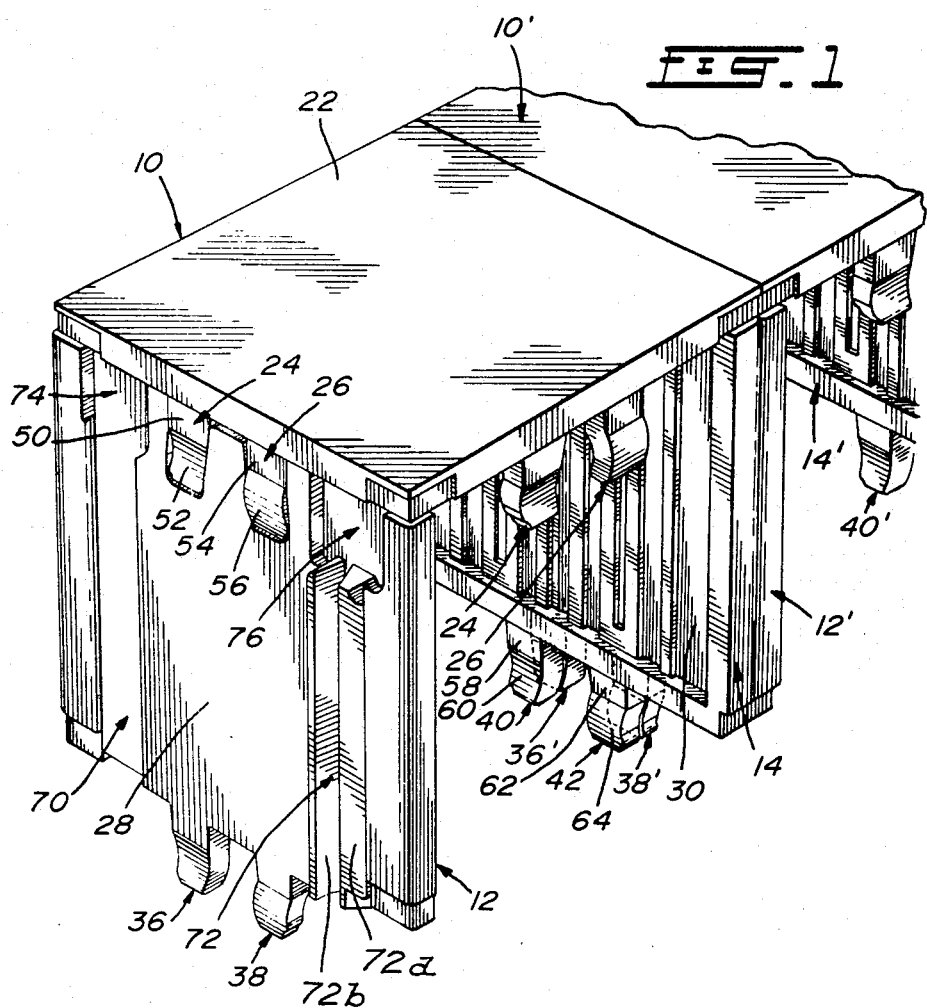
FIG. 1 is a perspective view showing a series of inter-connected parts of a mosaic display panel, some of which embodying the present invention.
Figure 2:
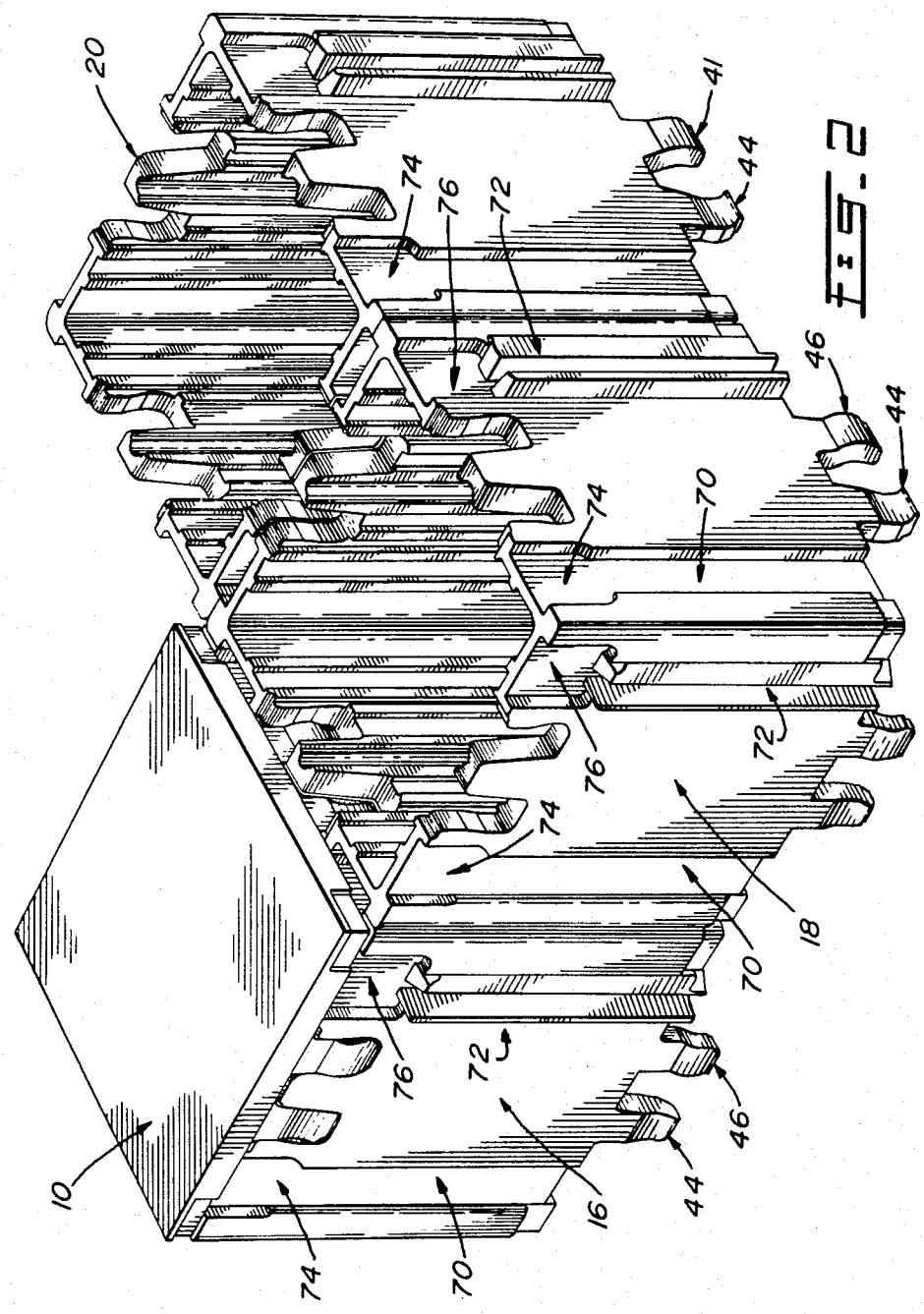
FIG. 2 is a perspective view showing four inter-connected components of a mosaic display panel, three of which embodying the present invention.

Referring to FIGS. 1 and 2, there are shown some of the components which may form part, when inter-connected and mounted to appropriate horizontal and vertical supports (not shown), of a mosaic instrument display panel such as the one shown in said Canadian Pat. No. 1,126,023. For example, FIG. 1 shows two tiles 10 and 10' and four identical longitudinal side supports 12, 14, 12', 14' which, together, define two channels through which may pass various electrical conductors for instruments, such as switches, lights, etc. which may be mounted to a display panel. In the case of FIG. 2, tile 10 is shown engaged to one of three serially connected self-supporting blocks 16, 18 and 20 which all have identical configuration. Each component shown is preferably made of thermoplastic material and formed by injection molding.

Tiles 10 and 10' define with adjacently disposed tiles (not shown), the front face of the display panel. The top face 22 of a tile may be plane or display lines and/or symbols such as seen on electrical power distribution panels for example. Also, the material may be opaque or translucid to transmit light in cases where a bulb is mounted in a block behind the tile. Finally, tile 10 defines a rectangular body having four sidewalls, each sidewall displaying a pair of legs 24 and 26 transversely spaced from one another and depending from the sidewall.

Referring to FIG. 1, the display panel components 12 and 14 are identical in construction and each include an outer wall 28 and an inner wall 30. Each component 12, 14 includes a pair of depending legs 36 and 38, 40 and 42, respectively, which are all identical in shape and construction to legs 24 and 26 forming part of the sidewalls of tile 10. Components 12 and 14 may vary in length so that it is possible to have on one sidewall more than one pair of legs.

Referring to FIG. 2, each block displays a rectangular body having four sidewalls, each sidewall having a shape similar to that of components 12, 14 of FIG. 1. The outer face of each block includes a pair of depending legs 44 and 46 which are identical in construction to that of legs 24 and 26 of tile 10 or to that of legs 26, 38 and 40, 42 of components 12 and 14. One feature of these legs is that they are adapted to flex in two directions: one is perpendicular to the plane of the sidewall while the second is in a plane extending through both legs. A detailed description of these legs is given in U.S. patent application Ser. No. 390,057 filed June 18, 1982. It should be mentioned however, that leg 24 has an outer face that includes a flat portion 50 and a concave portion 52 while the outer face of leg 26 has a flat portion 54 and a convex portion 56. The inner face of leg 40 has a flat portion 58 and a convex portion 60 while the inner face of leg 42 has a flat portion 62 and a concave portion 64. The inner face of each leg needs not have the configuration shown; for example, it may be flat. However, the configuration shown is preferred since it is envisaged to be engaged, for example, with a printed circuit board received between components 12 and 14, such board being provided with legs similar to those of the present invention.

Figure 3:
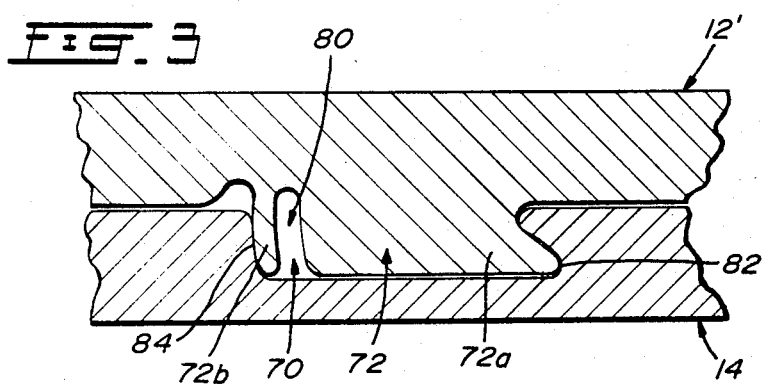
FIG. 3 is a partial enlarged sectional view showing the inter-connection of two adjacently disposed elements; this figure is shown on the sheet illustrating FIG. 1.

The outer face of each sidewall of elements 12, 12', 14 of FIG. 1 as well as of blocks 16, 18, 20 of FIG. 3 displays a basic configuration which includes a channel 70 longitudinally extending from the upper to the lower edge of the sidewall and, transversely spaced from this channel 70, an outwardly projecting guide 72 which extends from the lower edge of the sidewall to a distance short of the upper edge thereof. The upper part of channel 70 displays an entry pocket 74 having a width somewhat larger than that of the channel. Similarly, the remaining sidewall portion above guide 72 defines also a pocket 76 having a width greater than that of the guide itself.

FIG. 3 shows that the shape of guide 72 of element 12' so dimensioned as to be included in channel 70 of element 14. The projecting guide 72 includes a longitudinal split 80 defining a large portion 72a and a narrow flexible portion 72b. Portion 72a has a chamfered portion 82 which fits in complementarily shaped recess 84 in channel 70. Portion 72b bears against face 84 of channel 70 and provides flexibility to the connection of the assembled parts.

An important feature of the present invention is the provision of pockets 74 and 76 which greatly facilitates the initial engagement of the parts to be assembled. This engagement is achieved by sliding the sidewall of one part relative to the sidewall of another part and the presence of pocket 74 directs more rapidly projection 72 in its associated channel and the absence of projection 72 in pocket 76 assists in facilitating this initial engagement.

The embodiments of the invention in which an exclusive property or privilege is claimed are defined as follows:

1. A self-supporting element for use in the assembly of a mosaic display panel, comprising: a rectangular body having a sidewall displaying on the outer face thereof outwardly projecting longitudinal guide means and longitudinal channel means spaced transversely from said guide means and disposed generally parallel thereto; said channel means having a cross-section so dimensioned as to include therein the cross-section of said guide means whereby the guide means and channel means of a similarly constructed sidewall of an adjacently disposed element slidably interfit in said channel means and said guide means, respectively; each said channel means including at one end thereof entry pocket means, having a width significantly than said channel means, for facilitating initial engagement of the guide means of a first of two of said self-supporting elements with the channel means of a second of said elements, and vice versa, during sliding motion of said elements with respect to each other.

2. A self-supporting first block for mounting to a similarly constructed second block in the assembly of a mosaic display panel, comprising: a rectangular body of each block having opposite sidewalls, each sidewall having an outer face displaying thereon outwardly projecting longitudinal guide means and longitudinal channel means spaced transversely from said guide means and disposed generally parallel thereto; said channel means having a cross-section so dimensioned as to include therein the cross-section of said guide means whereby the guide means and channel means of said second, adjacently disposed block may interfit in said channel means and said guide means, respectively of said first block; each said guide means including, at one end thereof, entry pocket means, having a width significantly greater than said guide means, for facilitating initial engagement of the guide means of said first block with the channel means of said second block, and vice versa, during sliding motion of said first and second blocks with respect to each other.

3. A self-supporting block as defined in claim 2, wherein said guide means display a longitudinal split defining two projections extending beyond the plane of said sidewall; one of said projections being flexible and defining a narrow trapezoidal profile providing a spring action when engaged to an associated channel means.

4. A self-supporting block as defined in claim 3, wherein the other projection includes a chamfered face adapted to come in contact with a complimentarily shaped face in said associated channel means.

5. A self-supporting block as defined in claim 2, 3 or 4, wherein each sidewall includes a pair of depending transversely spaced legs projecting beyond said sidewall between said guide means and said channel means, each leg having an inner face and an outer face and opposite side faces, said outer face including a curved portion; the curved portion of the outer face of one leg of a pair being concave while the curved portion of the outer face of the other leg being convex; said legs being made of elastic material whereby said legs are flexible in a first direction which is in a plane perpendicular to the sidewall and in a second direction which is in a longitudinal plane including said pair of legs to enable engagement with another component of said assembly.

6. A self-supporting block as recited in claims 2, 3, or 4 wherein said guide means includes entry pocket means, having a width greater than said channel means, for facilitating initial engagement of said guide means of said first block with said channel means of said second block, and vice-versa, during sliding motion of said first and second blocks with respect to each other, said entry pocket means being disposed at the same end of said guide means as the end of channel means at which said entry pocket means of said guide means is disposed.

7. a self-supporting block as recited in claim 5 wherein said guide means includes entry pocket means, having a width greater than said channel means, for facilitating initial engagement of said guide means of said first block with said channel means of said second block, and vice-versa, during sliding motion of said first and second blocks with respect to each other, said entry pocket means being disposed at the same end of said guide means as the end of channel means at which said entry pocket means of said guide means is disposed.

* * * * *